Oct. 23, 1928.

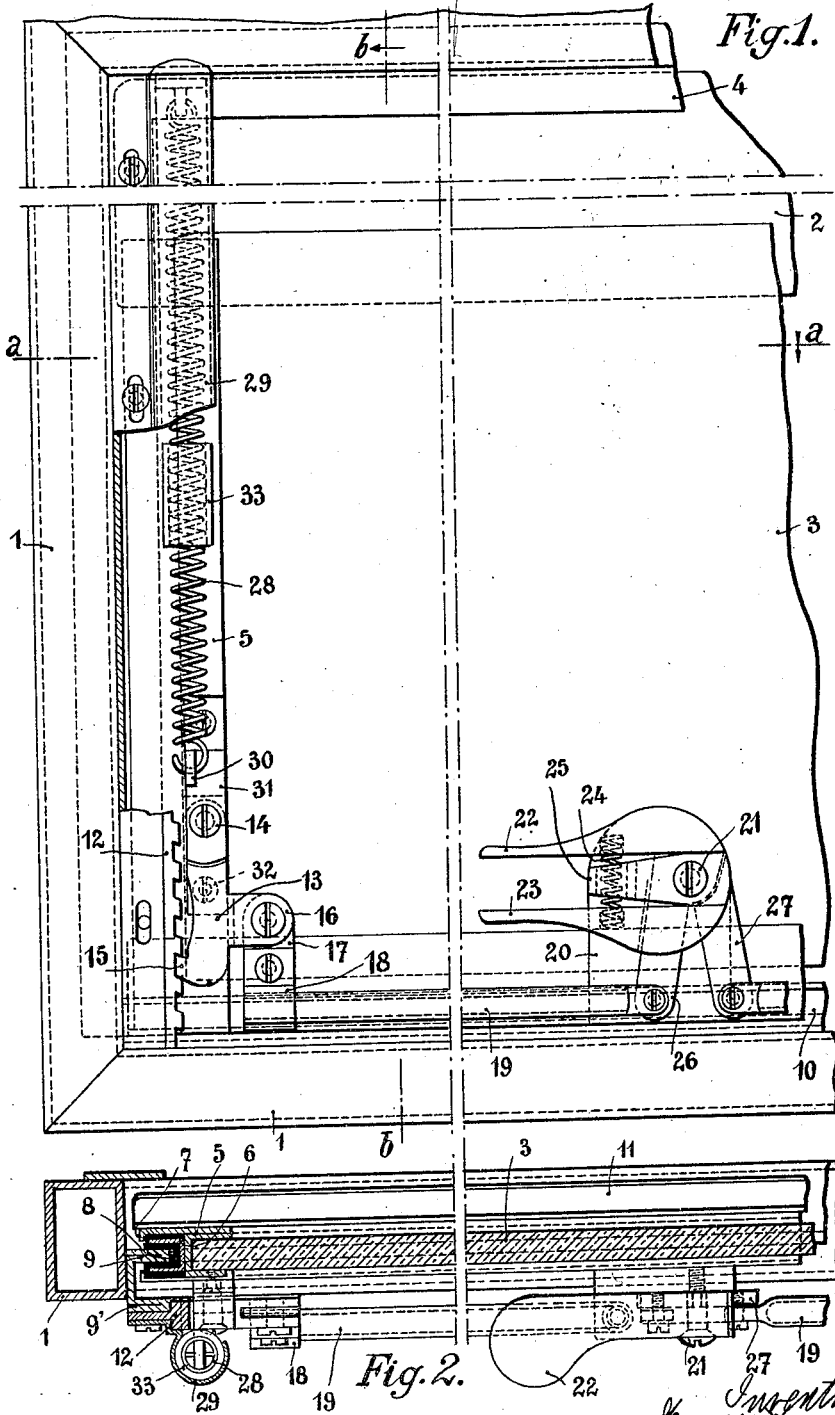

G. HAARNAGELL 1,689,132

WINDOW FOR DOORS OF MOTOR CARS AND THE LIKE

Filed Feb. 26, 1926  3 Sheets-Sheet 2

Georges Haarnagell Inventor by J. B. Singer, atty.

Oct. 23, 1928.

G. HAARNAGELL 1,689,132

WINDOW FOR DOORS OF MOTOR CARS AND THE LIKE

Filed Feb. 26, 1926    3 Sheets-Sheet 3

Inventor
Georges Haarnagell
By J. B. Singer, Atty.

Patented Oct. 23, 1928.

1,689,132

UNITED STATES PATENT OFFICE.

GEORGES HAARNAGELL, OF COURBEVOIE, FRANCE.

WINDOW FOR DOORS OF MOTOR CARS AND THE LIKE.

Application filed February 26, 1926, Serial No. 90,936, and in France March 21, 1925.

This invention relates to windows for motor-cars and other purposes, comprising a fixed upper glass and a vertically movable lower glass.

The object of the invention is to provide an improved window of this type which is simple and efficient and can be readily operated.

The sliding framings utilized in connection with the present invention are substantially the same as those provided in Letters Patent No. 1,574,387 of February 23, 1926.

The arresting of the window is effected by means of two pivoted catches engaging two lateral racks and controlled by means of a double armed gripping lever, through the medium of suitable connecting rods.

The gripping lever is disposed on a plate attached to the lower framing of the movable glass, the weight of this glass being compensated by two springs, preferably coiled springs disposed laterally in tubes arranged along the framing of the window. The springs are hooked at one end to the upper part of the sash and at the other end, to the framing of the movable glass and their vibrations are deadened by means of india rubber bushes. The invention also comprises at the lower part of the glass a channel for the discharge of water, thus permitting the glass to be raised, if desired during rain.

According to one form of the invention the glass is placed at one side of the framing carrying the velvet channel and of the guiding rail.

According to a second form, the spring is, in order to reduce the thickness of the assembly, disposed in the plane of the movable glass disposed laterally of the velveted channel and of its guiding rail. Hooks maintain the glass in its framing when removing the columns. An india rubber tongue fixed to a wing of the guiding rail ensures tightness of the device and prevents rattling.

In the accompanying drawings to which reference is made:

Figure 1 is a partial view, in elevation, of a metal sash comprising a movable lower glass with a double lateral arresting system controlled by a single handle and cooperating with compensational springs; and a fixed upper glass;

Figure 2 is a horizontal section according to line a—a of Figure 1, of the forementioned metal sash;

Figure 3:
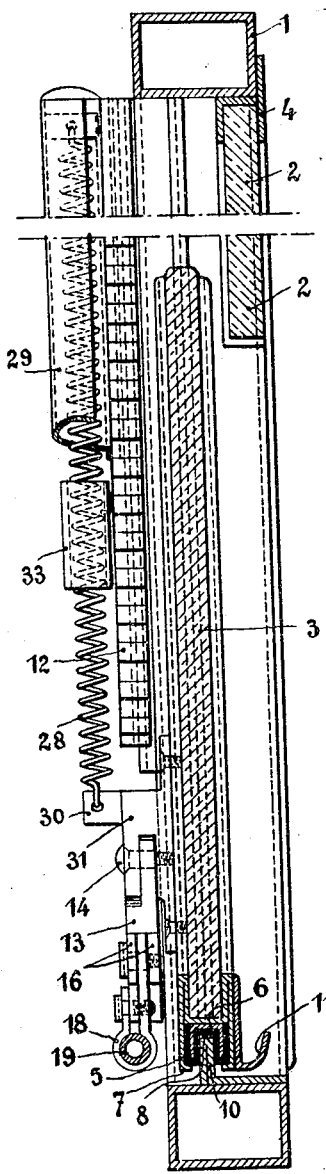
Figure 3 is a vertical section according to line b—b of Figure 1, of the sash.

The Figures 1 to 3 show the first form of the invention including the metallic sash 1, a fixed upper glass 2 disposed towards the exterior of the door, and a lower glass 3 which is vertically movable. In its lowered position this glass 3 partially covers the fixed upper glass 2 (Fig. 3).

The upper glass 2 is fixed on three sides in a U-like framing 4 disposed along the metal sash.

The lower glass 3 is fixed with three sides between the branches of an H-like framing, the opposite branches receiving a felted channel 6 kept in its place by means of lower borders 7 and receiving a fibre band 8 which is destined to avoid tear and wear of velvet or the like.

The lateral channels 5 of the framing serve to guide the glass along two tongue like guiding rails 9 disposed on the vertical parts of the metal sash and consisting of a folded metal band.

The framing channel 5 in the lower part of the frame serves simply to effect the joint in the lowered position (Figure 3) of the glass, the felted channel 6 placing itself on the tongue 10 disposed along the sash.

A channel 11 collects the water flowing down the glasses and discharges the same at its ends; hence it is possible to raise the glass if it rains.

Two racks 12 with inclined teeth are disposed on the wing 9' of the lateral guiding rails, and fixed by means of adjustable buttons. Two catches 13 oscillating around pivots 14 engage by means of their teeth 15 the teeth of the rack 12. These catches have projections 16 between which engages a lug 17 of a collar 18 serving for the fixation of a tube like connecting rod 19 controlling the catches.

A plate 20 disposed on the lower framing of the glass carries an articulation pivot 21 for the two branches 22, 23 of the double controlling gripping lever. These two branches are normally distanced by means of a spring 24 guided by the piece 25. Each branch of the gripper is connected to a connecting rod 26, 27 articulated at the flattened extremity of the tube like link 19.

The spring 24 tends constantly to keep the teeth 15 engaged with the teeth of the rack 12 the inclinations of the latter facilitating the engagement of the tooth 15.

The fastening collars 18 enable the operative length of the links 19 to be regulated. It is obvious that the double gripping lever 22, 23 can be disposed within reach of the hand at any desired point of the lower framing of the glass by suitably proportioning the length of the links 19.

In same special cases the gripping lever could be disposed in corners of the sash.

In order to compensate for the weight of the movable glass, two spiral springs 25 are used which are arranged in tubes 29 fixed on the wings 9' of the lateral guiding rails. These springs are hooked on the upper part of the sash in a convenient point of the same and at the lower part to flanges 30 of a piece 31 fixed at 32 on the lateral framing of the glass and forming a lodging for the oscillating catches 13.

India rubber bushes 33 slipped over the springs 28 prevent their floating and deaden their vibrations.

In order to raise the lower glass, the gripper 22, 23 is acted upon, the spring 24 compressed and the teeth 15 released from the racks. In order to fix the glass in any position, the two branches of the gripper are released, whereupon the spring 24 moves them into their initial position and applies the teeth 15 of the catches into the notches of the rack.

Such devices can be utilized either for the establishment of a sash having only one glass movable in vertical direction; or for the establishment of a window having one lower fixed glass and one upper movable glass, in which case the controlling system is disposed in the upper part of the movable glass.

Figure 4:
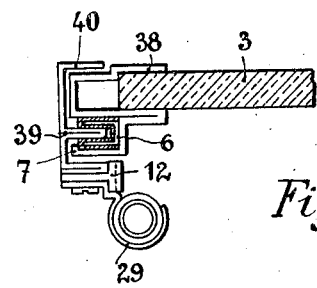
Figures 4 and 5 are respectively horizontal and vertical sections of the first form of the invention in which the glass is set at one side of the guiding rail.
Figure 5:
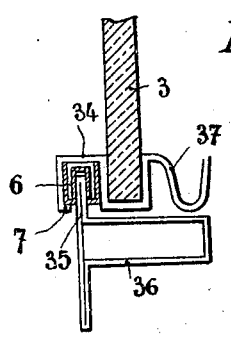

In Figures 4 and 5 another executional form is represented, where the movable glass 3ª is placed at one side of the velveted channel and its guiding rail. Figure 4 corresponds to Figure 2 and Figure 5 to Figure 3. It will be noticed that the lower framing channel, instead of having the shape of the letter H and instead of receiving a felted channel between its lower branches, assumes the form of a horizontally disposed letter S, piece 34, which serves, at one part, for the fixation of the glass 3 and at the other part, for forming a felted channel 6 by means of its flanges 7. This felted channel places itself in the lowered position (Figure 5) over the tongue 35 made in one piece with the metal sash 36. The channel 37 in this form of the invention is integral with the S like framing 34.

On the lateral borders the glass 3 is lodged between the branches of an S like profile 38, which on the other part serves for the fixation of a felted sliding channel 6 retained by the flanges 7. The guiding rail 39 has the form of a double U. One of the wings 40 serves to maintain in place the framing of the glass if dismounting one of the vertical parts; the other wing serves, as previously, for the fixation of the rack 12 and of the tube for the spring, 29. The rain-water is obliged in this case to traverse several ways before arriving to the felt.

Figure 6:
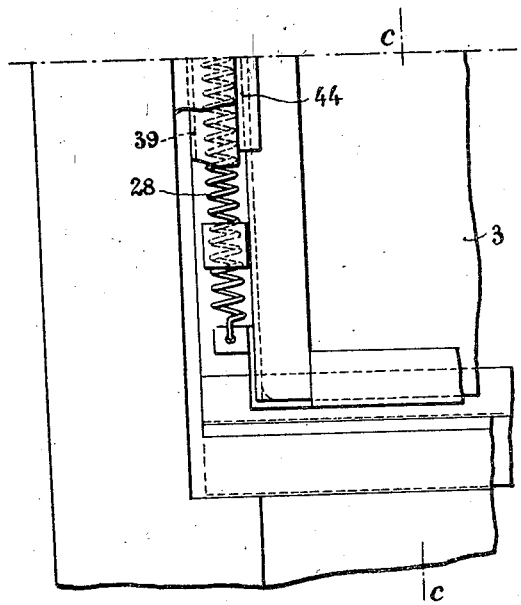
Figure 6 is a partial elevation of the second form, according to which the compensational springs are disposed in the same plane as the movable glass.
Figure 7:
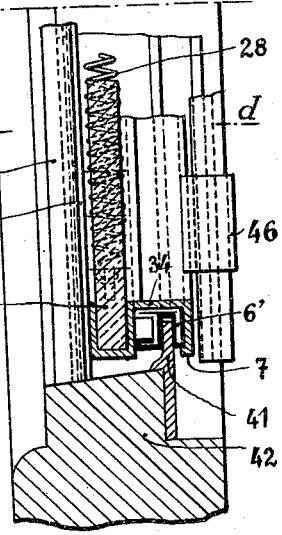
Figure 7 is a vertical section according to line c—c of Figure 6.
Figure 8:
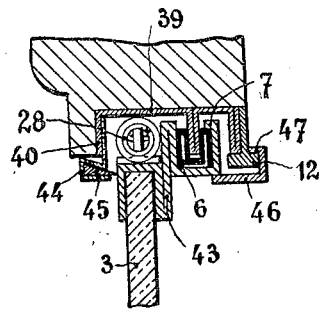
Figure 8 is a horizontal section according to line d—d of Figure 7.

In Figures 6 to 8 another executional form is represented where the compensator springs are disposed in the same plane as the movable glass, in a manner to permit reduction of the width of the window, more especially for nonmetallic sashes. The drawn out part of the lower framing of the glass 3 has, as above, the form of a horizontally disposed letter S, part 34, serving, at one side, for the fixation of the glass 3 and, at the other side, for maintaining the felted drawn out part $6^f$ by the flange 7. This drawn out felted part places itself in the lowered position (Figure 7) over the tongue 41 attached to the sash of the glass 42.

On both lateral borders the glass 3 is framed into drawn out parts 43 formed by two profiles of an inverse U and fixing the felted profile 6 by means of flanges 7, said profile 5 serving for sliding along its guiding rail 39.

The lateral spring 38 is disposed behind the framing of the glass in a space left free by the guiding rail 39 having the form of a double U. The inner wing of this guiding rail serves for the fixation of a (profile 44 retaining) rack 12, the outer wing 40 serving eventually for the fixation of a profile 44 retaining inwardly an india-rubber tongue 45 applied also on the whole length of the framing 43 of the glass 3. This tongue assures a perfect tightness of the device.

Since the glass is totally deviated from the sliding tongue, hooks 46 fixed to the drawn out part 43 and maintained by their angular borders 47 are used to maintain the glass 3 in its guiding channel if the vertical part of the sash is removed.

India rubber bushes 33 deaden, as previously stated, the vibrations of the lateral springs.

The mode of the lateral arresting is the same as previously described.

It is obvious that the different described and illustrated devices can be employed for glasses not necessarily appertaining to vehicles; for example to glasses of shop-fronts, of glass-cases and so on. All necessary modifications for such use can be employed without departing from the scope of the present invention.

What I claim, is:—

1. In a window of the class described, a frame, vertical rack bars at opposite sides of the frame, a glass movable vertically in the frame, catches mounted on the glass for engagement with the racks, a pair of gripper levers mounted on the glass for manual manipulation and each connected to one of the catches and a spring active on said gripper levers to normally keep the catches in engaged position, each catch being pivotally mounted and provided with a lug having a gripping collar, each lever having an arm and each lever arm being connected to one of the gripping collars by a rod which extends through and is adjustable in said collar.

2. In a window of the class described, a frame, vertical rack bars at opposite sides of the frame, a glass movable vertically in the frame, catches pivotally mounted on the glass for engagement with the racks and each having a lever arm, a pair of gripper levers mounted on the glass for manual manipulation and each having an arm, a spring active on and between said gripper levers to normally keep them in opened relation and connecting rods each pivotally connected to the arm of one of the gripper levers and also connected to the lever arm of one of the catches so that there is double transmission and reduction between the manually operable gripper levers and the said catches.

In witness whereof I affix my signature.

GEORGES HAARNAGELL.